United States Patent

[11] 3,569,783

| [72] | Inventor | Holger Nicolaisen<br>Nordborg, Denmark |
|---|---|---|
| [21] | Appl. No. | 842,184 |
| [22] | Filed | July 16, 1969 |
| [45] | Patented | Mar. 9, 1971 |
| [73] | Assignee | Danfoss A/S<br>Nordborg, Denmark |

[54] A.C. FED SWITCHING MEANS FOR THE FLAME MONITORS OF HEATING SYSTEMS
1 Claim, 1 Drawing Fig.

[52] U.S. Cl. .................................................. 317/13,
317/40, 317/130, 431/16, 431/79
[51] Int. Cl. ....................................................H02h 7/085,
F23n 5/24
[50] Field of Search.......................................... 317/13, 40,
130; 431/16, 79, (Inquired)

[56] References Cited
UNITED STATES PATENTS

| 3,041,515 | 6/1962 | Vaughan | 317/40X |
| 3,270,799 | 9/1966 | Pinckaers | 317/130X |
| 3,275,058 | 9/1966 | Gage et al. | 431/16 |
| 3,445,172 | 5/1969 | Zielinski | 317/130X |
| 3,462,233 | 8/1969 | Matthews | 317/33X |

*Primary Examiner*—James D. Trammell
*Attorney*—Wayne B. Easton

ABSTRACT: The invention relates to A.C. fed switching means for the flame monitor of a heating system. A D.C. motor relay is connected in series with the heating coil of a safety switch and with a photoelectrically operated switch. The photoelectrically operated switch is bridged by a resistor and the motor relay is bridged by a rectifier.

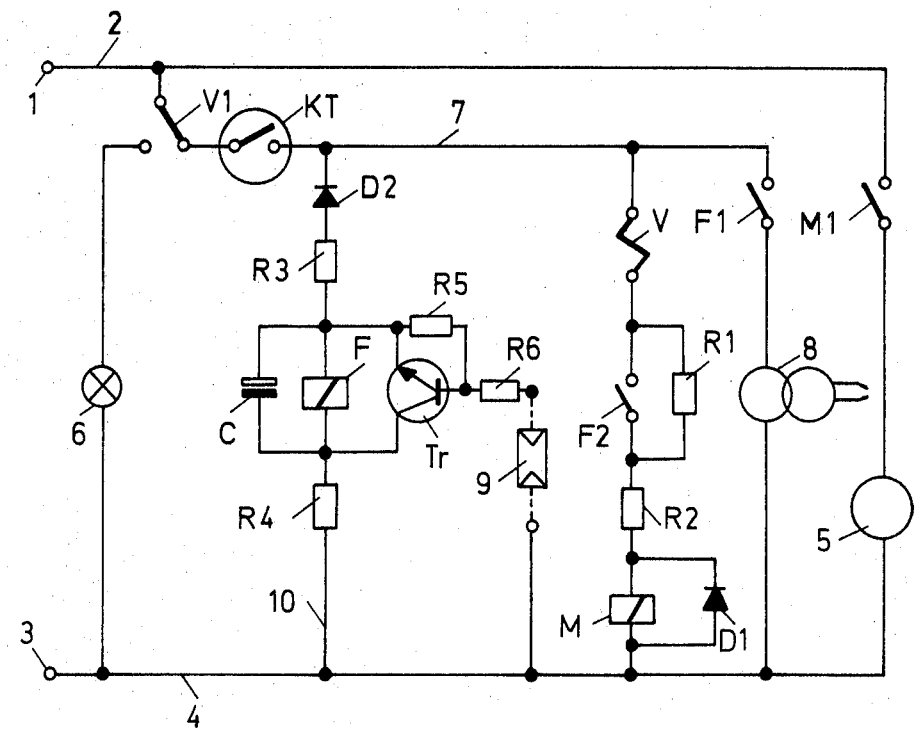

A.C. FED SWITCHING MEANS FOR THE FLAME MONITORS OF HEATING SYSTEMS

The invention relates to an AC fed switching means for the flame monitors of heating systems, in which a motor relay is connected in series with the heating coil of the safety switch and a photoelectric switch bridged by a resistor.

A switching means of this kind is known, in which the bridging resistor is so rated that the current of the series connection flowing therethrough is not only greater than the holding current but smaller than the current at which the motor relay operates; moro moreover the current flowing through the resistor is also smaller than the current at which the safety switch operates. In this way and using only a few components, a switching means of simple construction is b obtained which is capable of carrying out the normal programme and whereby, in addition, the greatest possible degree of safety is ensured. In particular, the motor is immediately switched off if any one of the elements connected in series should become damaged and if the current is briefly interrupted.

The known switching means is suitable both for alternating current operation and direct current operation. The use of a direct current relay has the advantage that it requires less power than an alternating current relay, responds more precisely and can be readily adapted to suit various operating conditions.

The use of a direct current relay, although basically possible, calls for the inclusion of a rectifier or a rectifier arrangement, e.g. a Graetz switching unit, and of one or more smoothing units. Thus, it is known in normal relay techniques, to connect a condenser in parallel with a direct current relay and to connect this parallel connection in series with a rectifier, to an AC source.

It a is also known to apply DC voltage to a relay and to bridge it by a rectifier in order to achieve a breaking delay.

The object of the invention is to provide an AC fed flame monitor switching means, in which the AC relay can be replaced by a DC relay, whilst employing the smallest possible number of additional elements.

According to the invention, this object is achieved by the motor relay, a DC relay and its winding being bridged by a rectifier.

In this switching arrangement, the alternating current flows only in one of the half-cycles through the relay, whilst in the second half-cycle it is caused to bypass through he the rectifier. Due to its inductive properties, the relay also passes a certain current in the second half-cycle, which current is conducted by one of the connectors of the relay winding to the other connector by way of the rectifier. For this reason, the relay remains pulled up in both half-cyles. A further advantage of this switching means resides in the fact that in the rest of the series connection the full alternating current power is available. Therefore, with a given relay, even when the initially stated rating requirements are met, the heating coil is fed with a very large power. All this is possible without an additional smoothing unit being required.

The invention will now be described by reference to an embodiment illustrated in the drawing, in which is shown the connection diagram for the flame monitor of a heating system.

An alternating current source is connected to a terminal 1 for a supply conductor 2 and to a terminal 3 for a neutral conductor 4. The supply conductor 2 runs through a contact M1 of a motor relay M to a motor 5. Also, the terminal 1 a can be connected through a contact V1 of a safety switch 1 and, normally, through a boiler thermostat KT, to the rest of the switching means, or, when the safety switch V responds, it can be connected to an indicating device 6. Between the conductor 7, behind the boiler thermostat, and the neutral conductor 4 is a first series connection, consisting of the contact F1 of a photoelectric relay F and an ignition transformer 8. In parallel therewith is a second series connection, consisting of the heating coil of the safety relay 7, a contact F2 of the photoelectric relay F, bridged by a resistor R1, a further series resistor R2 and the direct current motor relay M bridged by a rectifier D1. A third series connection, arranged between the conductor 7 and the neutral conductor 4, consists of a rectifier D2, a series resistor R3, the photoelectric resistor F and a working resistor R4. A condenser C and the collector-emitter gap of a transistor Tr are connected in parallel with the photoelectric resistor. Also, a series connection consisting of two voltage-divider resistors R5 and R6 and of a photoresistor 9 is connected in parallel with the photorelay F. The base of the transistor Tr is connected to the junction between the resistors R5 and R6.

In the case of the second series connection the resistor R1 is so rated that when the contact F2 is open in the series connection, there flows a current of such magnitude that it is greater than the holding current of the relay M, but smaller than the current at which this relay M operates and than the current at which the safety relay V operates. This means that the motor can start up only if the contact F2 is closed, i.e. if the photoelectric resistor 9 indicates no flame. If, during operation, fluctuations in current occur in which the holding current is fallen short of, the motor relay M remains released and can be pulled up again only after the entire ignition cycle has been completed. If the heating coil of the safety relay V or the magnetic winding of the motor relay M is broken, the switching means remains or becomes inoperative. The series arrangement therefore provides self-monitoring.

The connection diagram shows that, outside the motor relay M, the full alternating current flows in the series connection, so that the full effective value of the alternating current is available for the wattage in the safety switch 7. Although each second half-cycle passes the motor relay M by way of the rectifier D1, a rectified current nevertheless flows in this relay during practically the entire "on" period, since in one of the half-cycles the current is driven through the relay by the alternating voltage, whilst, at least over part of the second half-cycle, a current flows in the circuit formed by the winding and the rectifier D1 as a result of the inductance of the relay winding. Consequently, the direct current relay M remains very securely pulled up, although no separate slow-release or smoothing units are present in addition to the rectifier.

The switching means operates as follows: when the boiler thermostat KT switches on, the photoelectric resistor 9 is initially not lit up. The transistor Tr is in the nonconducting condition. The photoelectric relay F pulls up. Consequently the ignition transformer 8 and the motor relay M receive voltage. The motor relay pulls up. The motor 5 begins to run. As soon as the delivered oil is ignited, the photoelectric resistor 9 lights up. The transistor Tr becomes conductive. The photoelectric relay F releases. Ignition is interrupted. The current through the motor relay is reduced to a value lying between that of the holding current and that of the pullup current. If, during this startup operation, no flame should appear or during operation the flame should be extinguished, the photoelectric relay F would remain in if no flame should appear or would pull in should the flame be extinguished. There then flows through the motor relay M and the coil of the safety switch V a higher current, which causes tripping of the contact V1 after a prescribed period.

I claim:

1. A flame monitoring circuit for a heating system comprising an AC source, a DC motor relay, a heating coil of a safety switch in series with said motor relay, a photoelectrically operated switch in series with said motor relay, said photoelectrically operated switch being bridged by a resistor, and said motor relay being bridged by a rectifier.